United States Patent
Onishi et al.

(10) Patent No.: US 11,408,479 B2
(45) Date of Patent: Aug. 9, 2022

(54) ANTI-VIBRATION DEVICE

(71) Applicant: BRIDGESTONE CORPORATION, Chuo-ku Tokyo (JP)

(72) Inventors: Tadashi Onishi, Tokyo (JP); Yukiko Abe, Tokyo (JP); Kenichirou Iwasaki, Tokyo (JP); Masato Kobayashi, Tokyo (JP); Kei Yasui, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 281 days.

(21) Appl. No.: 16/758,045

(22) PCT Filed: Nov. 6, 2018

(86) PCT No.: PCT/JP2018/041213
§ 371 (c)(1),
(2) Date: Apr. 22, 2020

(87) PCT Pub. No.: WO2019/093337
PCT Pub. Date: May 16, 2019

(65) Prior Publication Data
US 2020/0318703 A1    Oct. 8, 2020

(30) Foreign Application Priority Data

Nov. 7, 2017  (JP) .............................. JP2017-214892

(51) Int. Cl.
*F16F 3/093*     (2006.01)
*F16F 15/08*     (2006.01)
*B60K 5/12*      (2006.01)

(52) U.S. Cl.
CPC .............. *F16F 3/093* (2013.01); *F16F 15/08* (2013.01); *B60K 5/1208* (2013.01); *F16F 2224/02* (2013.01); *F16F 2224/0208* (2013.01)

(58) Field of Classification Search
CPC ........ F16F 3/093; F16F 15/08; F16F 2224/02; F16F 2224/0208; B60K 5/1208
(Continued)

(56) References Cited

FOREIGN PATENT DOCUMENTS

DE    102012014477 A1    1/2014
JP    H07158674 A        6/1995
(Continued)

OTHER PUBLICATIONS

Jul. 22, 2021, search result of the Extended European Search Report issued by the European Patent Office in the corresponding European Patent Application No. 18875188.7.
(Continued)

*Primary Examiner* — Christopher Garft
*Assistant Examiner* — Michael McDuffie
(74) *Attorney, Agent, or Firm* — Kenja IP Law PC (57) ABSTRACT

A anti-vibration device (1) includes a bracket (4) made of a synthetic resin and cylindrical metal fittings for fastening (5), where the bracket (4) and the metal fittings for fastening (5) are integrally formed. A vibration input position (P) is a position that does not coincide with a virtual line (L1) passing through central axes (O5) of a through holes (5h) of two metal fittings for fastening (5) in a planar view; the metal fitting for fastening (5) has a flange portion (51); and the flange portion 51 has a first outermost peripheral edge (51a) and a second outermost peripheral edge (51b), where a length (L51a) to the first outermost peripheral edge (51a) is longer than a length (L51b) to the second outermost peripheral edge (51b) based on the center axis (O5) of the through hole (5h).

20 Claims, 5 Drawing Sheets

(58) Field of Classification Search
USPC ....... 248/560, 580, 581, 584, 592, 593, 596,
248/603, 605, 602, 609, 614, 626
See application file for complete search history.

(56) References Cited

FOREIGN PATENT DOCUMENTS

| | | |
|---|---|---|
| JP | H07280034 A | 10/1995 |
| JP | H1082442 A | 3/1998 |
| JP | 2000337443 A | 12/2000 |
| JP | 2007127239 A | 5/2007 |

OTHER PUBLICATIONS

Dec. 4, 2018, International Search Report issued in the International Patent Application No. PCT/JP2018/041213.

May 12, 2020, International Preliminary Reporton Patentability issued in the International Patent Application No. PCT/JP2018/041213.

ANTI-VIBRATION DEVICE

TECHNICAL FIELD

This disclosure relates to an anti-vibration device.

BACKGROUND

Examples of an anti-vibration device include one having an attachment member that can be attached to one side of a vibration generating side and a vibration transmitting side, a bracket that is made of a synthetic resin and is connected to the attachment member via an elastic member, and two metal fittings for fastening that have a through hole for fastening the bracket to the other side of the vibration generating side and the vibration transmitting side.

A conventional example of the above-mentioned anti-vibration device is an anti-vibration device in which an end portion of the metal fitting for fastening is bent outward to form a flange portion, and the outer peripheral shape of the flange portion is a non-perfect circular shape (for example, see JP H10-82442 A (PTL 1)). Another conventional example of the above-mentioned anti-vibration device is an anti-vibration device in which a nut is used as the metal fitting for fastening, and a middle portion of the nut is formed into a detent shape whose outer periphery is not circular (for example, see JP 2000-337443 A (PTL 2)). Using the metal fitting for fastening described in PTL 1 and PTL 2 can prevent the relative rotation of the metal fitting for fastening with respect to the resin bracket.

CITATION LIST

Patent Literature

PTL 1: JP H10-82442 A
PTL 2: JP 2000-337443 A

SUMMARY

Technical Problem

However, as a result of analyzing such conventional anti-vibration devices and the like, we recognized that a large stress concentration occurs locally in the bracket when a vibration is input under specific conditions, including the case, for example, where the outer periphery shape of the flange portion of the metal fitting for fastening is a perfect circle. Specifically, we focused on a virtual line that passes the central axes of the through holes of the two metal fittings for fastening in a planar view of the anti-vibration device, and performed the analysis by inputting a vibration based on the virtual line. As a result, we recognized that, in the case where the vibration is input at a position of one of the regions at two sides of the virtual line in the planar view, that is, at a position that does not coincide with the virtual line, a large stress concentration occurs locally in the bracket, particularly in a region that holds the metal fitting for fastening in the bracket.

It could thus be helpful to provide an anti-vibration device in which the stress concentration occurring in the bracket is suppressed when a vibration is input under specific conditions.

Solution to Problem

The anti-vibration device of the present disclosure comprises an attachment member that can be attached to one side of a vibration generating side and a vibration transmitting side, an elastic member, a bracket that is made of a synthetic resin and is connected to the attachment member via the elastic member, and at least two metal fittings for fastening that have a through hole for fastening the bracket to the other side of the vibration generating side and the vibration transmitting side, wherein the bracket and the metal fittings for fastening are integrally formed; a vibration input position is a position that does not coincide with a virtual line passing through central axes of the through holes of two of the metal fittings for fastening in a planar view of the anti-vibration device; the metal fitting for fastening has a flange portion on an edge side close to the vibration input position in a direction along the central axis of the through hole; and in the planar view, the flange portion has a first outermost peripheral edge and a second outermost peripheral edge, where the first outermost peripheral edge is positioned on a side of the vibration input position in a direction orthogonal to the virtual line, and the second outermost peripheral edge is positioned on the opposite side of the first outermost peripheral edge across the through hole and at a position that is farthest from the vibration input position in the direction orthogonal to the virtual line, and a length in the direction orthogonal to the virtual line from the central axis of the through hole of the metal fitting for fastening to the first outermost peripheral edge is longer than a length in the direction orthogonal to the virtual line from the central axis of the through hole of the metal fitting for fastening to the second outermost peripheral edge.

According to the anti-vibration device of the present disclosure, by defining the positional relationship between the vibration input position and the central axis of the through hole of the metal fitting for fastening and providing the metal fitting for fastening with a flange portion having a particular shape, the stress concentration occurring in the bracket is suppressed when a vibration is input under specific conditions.

In particular, for the anti-vibration device of the present disclosure, it is preferable that, in the planar view, the flange portion have an outline shape which is an elongated shape where a length in a direction along the direction orthogonal to the virtual line is longer than a length in a direction along the virtual line. In this case, it is possible to suppress the stress concentration while reducing the size of the flange portion.

For the anti-vibration device of the present disclosure, it is preferable that, in the planar view, the outline shape of the flange portion be an elliptical shape. In this case, it is possible to suppress the stress concentration while further reducing the size of the flange portion.

For the anti-vibration device of the present disclosure, it is preferable that the metal fitting for fastening have another flange portion on an edge side far from the vibration input position that is on the opposite side of the edge close to the vibration input position in the direction along the central axis of the through hole; and in the planar view, the other flange portion has a third outermost peripheral edge and a fourth outermost peripheral edge, where the third outermost peripheral edge is positioned outside in an extending direction of the virtual line, and the fourth outermost peripheral edge is positioned inside in the extending direction of the virtual line on the opposite side of the third outermost peripheral edge across the through hole, and a length in the extending direction of the virtual line from the central axis of the through hole of the metal fitting for fastening to the third outermost peripheral edge is longer than a length in the extending direction of the virtual line from the central axis of the through hole of the metal fitting for fastening to the fourth outermost peripheral edge. In this case, by further providing another flange portion having a particular shape in the metal fitting for fastening, it is possible to further suppress the stress concentration occurring in the bracket.

In particular, for the anti-vibration device of the present disclosure, it is preferable that, in the planar view, the other flange portion have an outline shape which is an elongated shape where a length in a direction along the virtual line is longer than a length in a direction along the direction orthogonal to the virtual line. In this case, it is possible to further suppress the stress concentration while reducing the size of the other flange portion.

For the anti-vibration device of the present disclosure, it is preferable that, in the planar view, the outline shape of the other flange portion be an elliptical shape. In this case, it is possible to further suppress the stress concentration while further reducing the size of the other flange portion.

For the anti-vibration device of the present disclosure, it is possible to set as follows: the at least two metal fittings for fastening are three metal fittings for fastening, the virtual line passes through the central axes of the through holes of two of the metal fittings for fastening, and the remaining one metal fitting for fastening is arranged at a position on the opposite side of the vibration input position across the virtual line in the planar view. In this case, the stress concentration occurring in the bracket fastened at three points can be suppressed.

For the anti-vibration device of the present disclosure, the attachment member may be a cylindrical member extending in a direction along the virtual line. In this case, even if the vibration generating side and the vibration transmitting side are rod-shaped members such as a shaft, the attachment member can be easily attached with a simple configuration.

Advantageous Effect

According to the present disclosure, it is possible to provide an anti-vibration device in which the stress concentration occurring in the bracket is suppressed when a vibration is input under specific conditions.

DETAILED DESCRIPTION

The following describes an anti-vibration device of an embodiment of the present disclosure with reference to the drawings.

Figure 1:
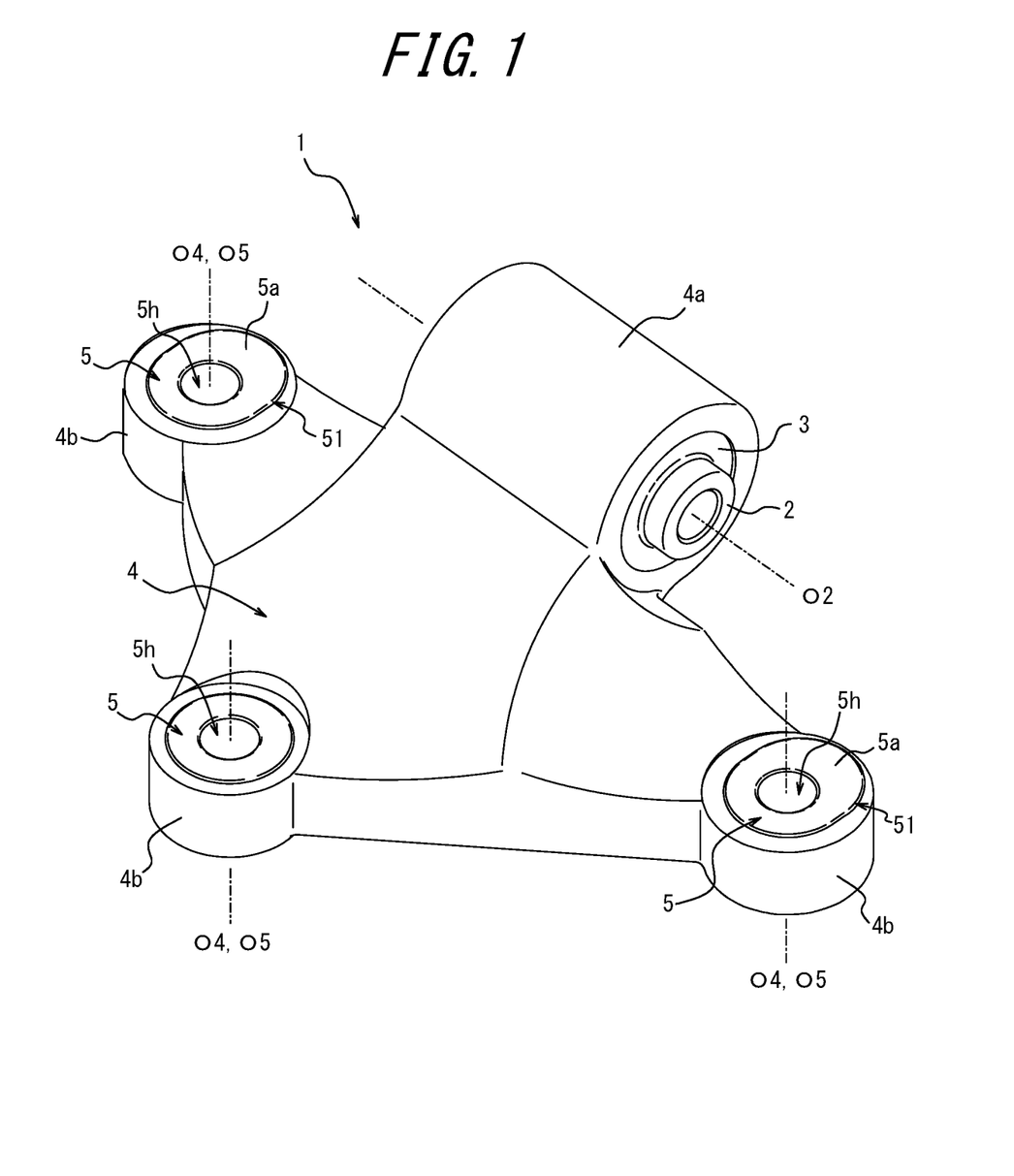
FIG. 1 is a perspective view illustrating an anti-vibration device of an embodiment of the present disclosure from one side of a vibration generating side and a vibration transmitting side.

In FIG. 1, reference sign 1 denotes an anti-vibration device of an embodiment of the present disclosure. As will be described later, the anti-vibration device 1 of the present embodiment is mainly made of a synthetic resin.

The anti-vibration device 1 of the present embodiment has an attachment member 2 that can be attached to one side of a vibration generating side and a vibration transmitting side. In the present embodiment, the attachment member 2 is a cylindrical member. The attachment member 2 is made of, for example, a metal such as an aluminum alloy. However, the attachment member 2 is not limited to a metal member. The attachment member 2 is not limited to a cylindrical member if it can be attached to one side of a vibration generating side and a vibration transmitting side.

In addition, the anti-vibration device 1 of the present embodiment has an elastic member 3. The elastic member 3 is made of, for example, an elastic material such as rubber. The elastic member 3 is connected to the attachment member 2 and a bracket 4 which will be described later. In the present embodiment, the elastic member 3 is connected to the attachment member 2 and the bracket 4 using methods such as bonding by an adhesive or bonding by vulcanization.

Further, the anti-vibration device 1 of the present embodiment has a bracket 4 made of a synthetic resin. The bracket 4 is connected to the attachment member 2 via the elastic member 3, as described above. In the present embodiment, the elastic member 3 is provided between an inner cylinder and an outer cylinder. In the present embodiment, the inner cylinder is the attachment member 2. In the present embodiment, the outer cylinder is a cylindrical portion 4a provided in the bracket 4. In addition, the bracket 4 has at least two fastening axes O4 for fastening the bracket 4 to the other side of the vibration generating side and the vibration transmitting side. In the present embodiment, the fastening axis O4 defines a position at which a metal fitting for fastening 5, which will be described later, is arranged with respect to the bracket 4. In the anti-vibration device 1 of the present embodiment, the at least two fastening axes O4 are three fastening axes O4.

Furthermore, the anti-vibration device 1 of the present embodiment has a plurality of metal fittings for fastening 5. Each metal fitting for fastening 5 is made of, for example, a metal such as an aluminum alloy. The metal fitting for fastening 5 is a cylindrical metal fitting for fastening having a through hole 5h. The through hole 5h is a through hole for fastening the bracket 4 to the other side of the vibration generating side and the vibration transmitting side. In the present embodiment, a shaft of a bolt (not illustrated in the figure), which is used to fasten the bracket 4 to the other side of the vibration generating side and the vibration transmitting side, can pass through the through hole 5h.

In the anti-vibration device 1 of the present embodiment, each of the three metal fittings for fastening 5 is provided in the bracket 4. In the present embodiment, each of the three metal fittings for fastening 5 is held by a metal fitting holding portion 4b provided in the bracket 4. The bracket 4 and the metal fittings for fastening 5 are integrally formed. In the present embodiment, the bracket 4 is integrally formed with the metal fittings for fastening 5 so that the central axes O5 of the through holes 5h of the metal fittings for fastening 5 coincide with the fastening axes O4 of the bracket 4. In the present embodiment, the central axes O5 of the through holes 5h of the metal fittings for fastening 5 are parallel to each other. In the present embodiment, the bracket 4 can be formed by placing three metal fittings for fastening 5 as inserts in a mold cavity for injection molding and injecting a synthetic resin into the mold cavity, for example. In the present embodiment, the bracket 4 is made of, for example, a synthetic resin such as a thermoplastic resin or a thermosetting resin. The synthetic resin is preferably a thermoplastic resin. Examples of the thermoplastic resin include 6-6 nylon, 6 nylon, and polypropylene.

In the anti-vibration device 1 of the present embodiment, the attachment member 2 is attached to one side of the vibration generating side and the vibration receiving side, and the bracket 4 is attached to the other side of the vibration generating side and the vibration receiving side. More specifically, the anti-vibration device 1 of the present embodiment is an anti-vibration device attached to a vehicle. In the present embodiment, the vibration generating side may be an engine side, and the vibration receiving side may be an automotive body side. Alternatively, in the present embodiment, the vibration generating side may be an automotive body side, and the vibration receiving side may be an engine side.

As a result of intensive studies and analyses, we confirmed that, when a vibration is input (from the vibration generating side or the vibration transmitting side) to the anti-vibration device, a large stress concentration occurs locally in the bracket 4. We found that one of the factors leading to such stress concentration is the positional relationship between the input position of the vibration P and the fastening axis O4 of the bracket 4, that is, the central axis O5 of the through hole 5h of the metal fitting for fastening 5. Specifically, as indicated by the point P in FIG. 2, in a planar view of the anti-vibration device 1, a large stress concentration occurs locally in the bracket 4 under the condition that the input position of the vibration P (hereinafter, also simply referred to as "vibration input position P") does not coincide with a virtual line L1. As used herein, the virtual line L1 is a virtual line passing through the central axes O5 of the through holes 5h of two metal fittings for fastening 5 in the planar view of the anti-vibration device 1. The planar view of the anti-vibration device 1 is a view in a plane orthogonal to the central axis O5 of the through hole 5h of the metal fitting for fastening 5.

Figure 2:
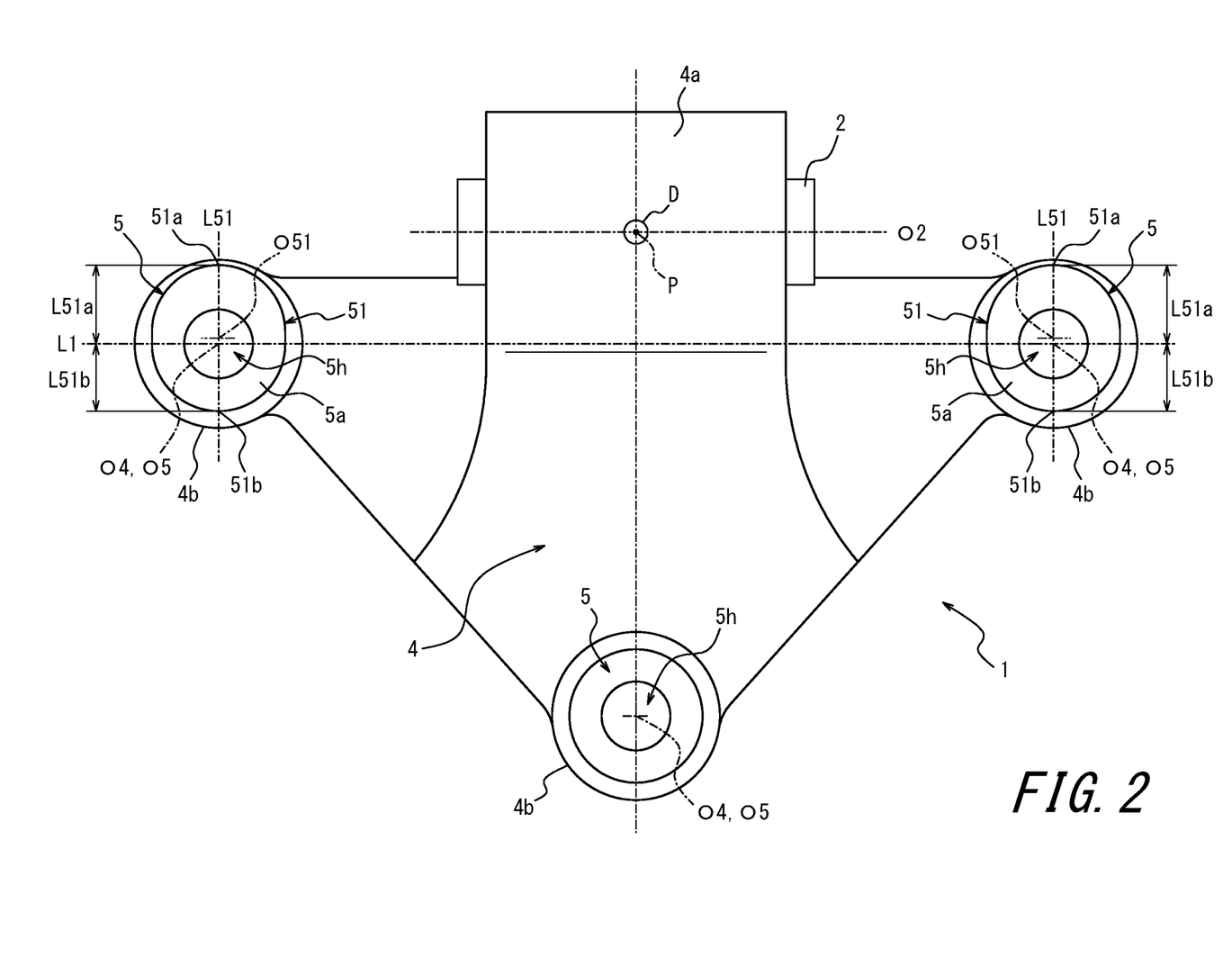
FIG. 2 is a plan view illustrating the anti-vibration device of FIG. 1 from the one side.

More specifically, in the planar view, the vibration input position P is a position that does not coincide with the virtual line L1 passing through the central axes O5 of the through holes 5h of two metal fittings for fastening 5 and is a position, among the regions on the two sides of the virtual line L1, in the region on the opposite side of the region on the side where the third metal fitting for fastening 5 is arranged across the virtual line L1, as illustrated in FIG. 2. More specifically, the vibration input position P is a position on the central axis O2 of the attachment member 2 that extends along the virtual line L1, as illustrated in FIG. 2. In the present embodiment, the attachment member 2 extends parallel to the virtual line L1. In the present embodiment, the vibration input position P is a position that does not coincide with the height of the two metal fittings for fastening 5 crossed by the virtual line L1 in a direction along the central axis O5 of the through hole 5h of the metal fitting for fastening 5, as illustrated in FIG. 3.

In addition, as a result of further studies and analyses, we also found that, by focusing on the metal fitting for fastening 5 and providing the metal fitting for fastening 5 with a flange portion having a particular shape, it is possible to suppress the stress concentration occurring in the bracket 4.

Figure 3:
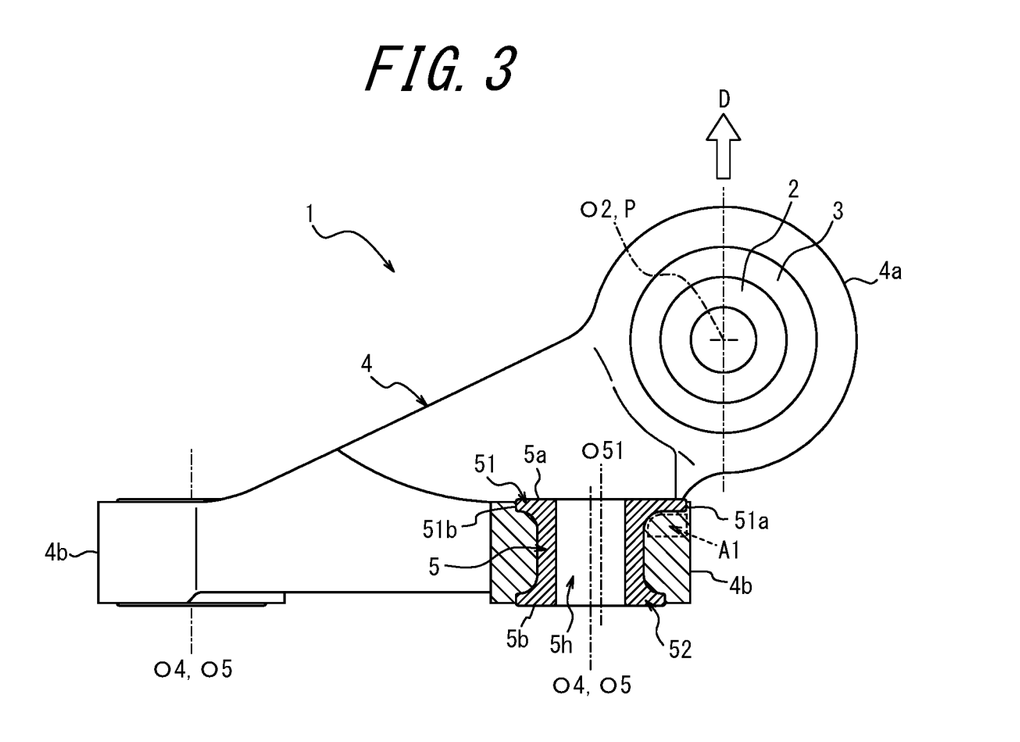
FIG. 3 is a side view illustrating one side surface of the anti-vibration device of FIG. 1 in a partial cross section.

In the anti-vibration device 1 of the present embodiment, each of the two metal fittings for fastening 5 crossed by the virtual line L1 has a flange portion 51 (hereinafter, also referred to as "first flange portion Si') on an edge 5a side close to the vibration input position P in the direction along the central axis O5 of the through hole 5h, as illustrated in FIG. 3. In the present embodiment, the first flange portion 51 coincides with one edge 5a of the metal fitting for fastening 5 and forms one end portion of the metal fitting for fastening 5. In addition, in the present embodiment, the first flange portion 51 has a first outermost peripheral edge 51a and a second outermost peripheral edge 51b in the planar view, where the first outermost peripheral edge 51a is positioned on the vibration input position P side in a direction orthogonal to the virtual line L1; and the second outermost peripheral edge 51b is on the opposite side of the first outermost peripheral edge 51a across the through hole 5h in the direction orthogonal to the virtual line L1, and the second outermost peripheral edge 51b is farthest from the vibration input position P, as illustrated in FIG. 2. As used herein, the "outer peripheral edge" means points on the outer periphery that forms the outline shape of the flange portion in the planar view. In the present embodiment, the first outermost peripheral edge 51a and the second outermost peripheral edge 51b of the first flange portion 51 are arranged on an axis L51, as illustrated in FIG. 2. In the present embodiment, the axis L51 is an axis that passes through the central axis O5 of the through hole 5h of the metal fitting for fastening 5 and is orthogonal to the virtual line L1.

In the anti-vibration device 1 of the present embodiment, for each of the two metal fittings for fastening 5 crossed by the virtual line L1 among the three metal fittings for fastening 5, the first flange portion 51 is configured such that a length L51a in the direction orthogonal to the virtual line L1 from the central axis O5 of the through hole 5h of the metal fitting for fastening 5 to the first outermost peripheral edge 51a is longer than a length L51b in the direction orthogonal to the virtual line L1 from the central axis O5 of the through hole 5h of the metal fitting for fastening 5 to the second outermost peripheral edge 51b. In the present embodiment, the length L51a of the first outermost peripheral edge 51a is a length in a direction along the axis L51 from the central axis O5 of the through hole 5h of the metal fitting for fastening 5 to the first outermost peripheral edge 51a of the first flange portion 51, as illustrated in FIG. 2 and the like. In addition, in the present embodiment, the length L51b of the second outermost peripheral edge 51b is a length L51b in the direction along the axis L51 from the central axis O5 of the through hole 5h of the metal fitting for fastening 5 to the second outermost peripheral edge 51b of the first flange portion 51.

According to the anti-vibration device 1 of the present embodiment, in each of the two metal fittings for fastening 5 crossed by the virtual line L1, the first flange portion 51 of the metal fitting for fastening 5 is extended toward the first outermost peripheral edge 51a side, which enlarges the portion of the first flange portion 51 on the first outermost peripheral edge 51a side, as illustrated in FIG. 3. In this way, the area where the metal fitting for fastening 5 covers the metal fitting holding portion 4b of the bracket 4 can be increased in a region of the bracket 4 adjacent to the region on the first outermost peripheral edge 51a side of the first flange portion 51 in the metal fitting for fastening 5, that is, a region A1 of the metal fitting holding portion 4b adjacent to the metal fitting for fastening 5, as illustrated in FIG. 3.

In the anti-vibration device 1 of the present embodiment, when the attachment member 2 is pulled at the vibration input position P to the upward direction in FIG. 3, for example, the entire bracket 4 is also pulled upward. In this case, as indicated by an arrow D in FIG. 3, the vibration is input at a position that does not coincide with the central axes O5 of the through holes 5h of the two metal fittings for fastening 5 crossed by the virtual line L1 but at a position shifted from the central axes O5. Therefore, a moment force in a direction away from the fastening points of the bracket 4 occurs in the direction indicated by the arrow D in the cylindrical portion 4a and the metal fitting holding portion 4b provided in the bracket 4. This moment force generates excessive stress at a specific location in the bracket 4. As used herein, the fastening point of the bracket 4 is an intersection point of the fastening axis O4 of the bracket 4 and the ground surface of the anti-vibration device 1. In the present embodiment, the fastening point of the bracket 4 is an intersection point of the central axis O5 of the through hole 5h of the metal fitting for fastening 5 and the ground surface of the metal fitting for fastening 5 (the other edge 5b of the metal fitting for fastening 5).

In a conventional anti-vibration device, when the entire bracket 4 is pulled upward, a large stress concentration occurs locally in the bracket 4. Such stress concentration is remarkable, for example, in a portion of a region that extends from the region A1 side of the metal fitting holding portion 4b toward the cylindrical portion 4a in the portion of the bracket 4, and in a portion of a region on the opposite side of the metal fitting for fastening 5 and outside the metal fitting for fastening 5 in the region of the cylindrical portion 4a.

On the other hand, according to the anti-vibration device 1 of the present embodiment, the large stress concentration that occurs locally in the above-mentioned portion of the region that extends from the region A1 side of the metal fitting holding portion 4b toward the cylindrical portion 4a in the bracket 4 and in the above-mentioned portion of the outside region on the opposite side of the metal fitting for fastening 5 in the region connected to the cylindrical portion 4a is reduced.

As described above, according to the anti-vibration device 1 of the present embodiment, by defining the positional relationship between the vibration input position P and the central axes O5 of the through holes 5h of the two metal fittings for fastening 5 and providing the metal fitting for fastening 5 with a first flange portion 51 having a particular shape, the stress concentration occurring in the bracket 4 is suppressed when a vibration is input under specific conditions.

Particularly in the anti-vibration device 1 of the present embodiment, the outline shape of the first flange portions 51 of each of the two metal fittings for fastening 5 crossed by the virtual line L1 is, in the planar view, an elongated shape in which a length in a direction along the direction orthogonal to the virtual line L1 (in the present embodiment, a direction parallel to the direction of the axis L51) is longer than a length in a direction along the virtual line L1, as illustrated in FIG. 2. In this case, it is possible to reduce the size of the external shape (outline shape) of the entire first flange portion 51 while extending the first flange portion 51 of the metal fitting for fastening 5 toward the first outermost peripheral edge 51a side. As a result, according to the anti-vibration device 1 of the present embodiment, it is possible to suppress the stress concentration while reducing the size of the first flange portion 51.

In the anti-vibration device 1 of the present embodiment, the outline shape of the first flange portion 51 is an elliptical shape in the planar view, as illustrated in FIG. 2. That is, the center O51 of the elliptical shape is arranged at a position that is closer to the vibration input position P than the central axis O5 of the through hole 5h of the metal fitting for fastening 5. In this case, it is possible to suppress the stress concentration while further reducing the size of the first flange portion 51.

Although the above description has been given for one of the two metal fittings for fastening 5 crossed by the virtual line L1, it is apparent that the other of the two metal fittings for fastening 5 crossed by the virtual line L1 has the same configuration and exhibits the same effects.

Figure 4:
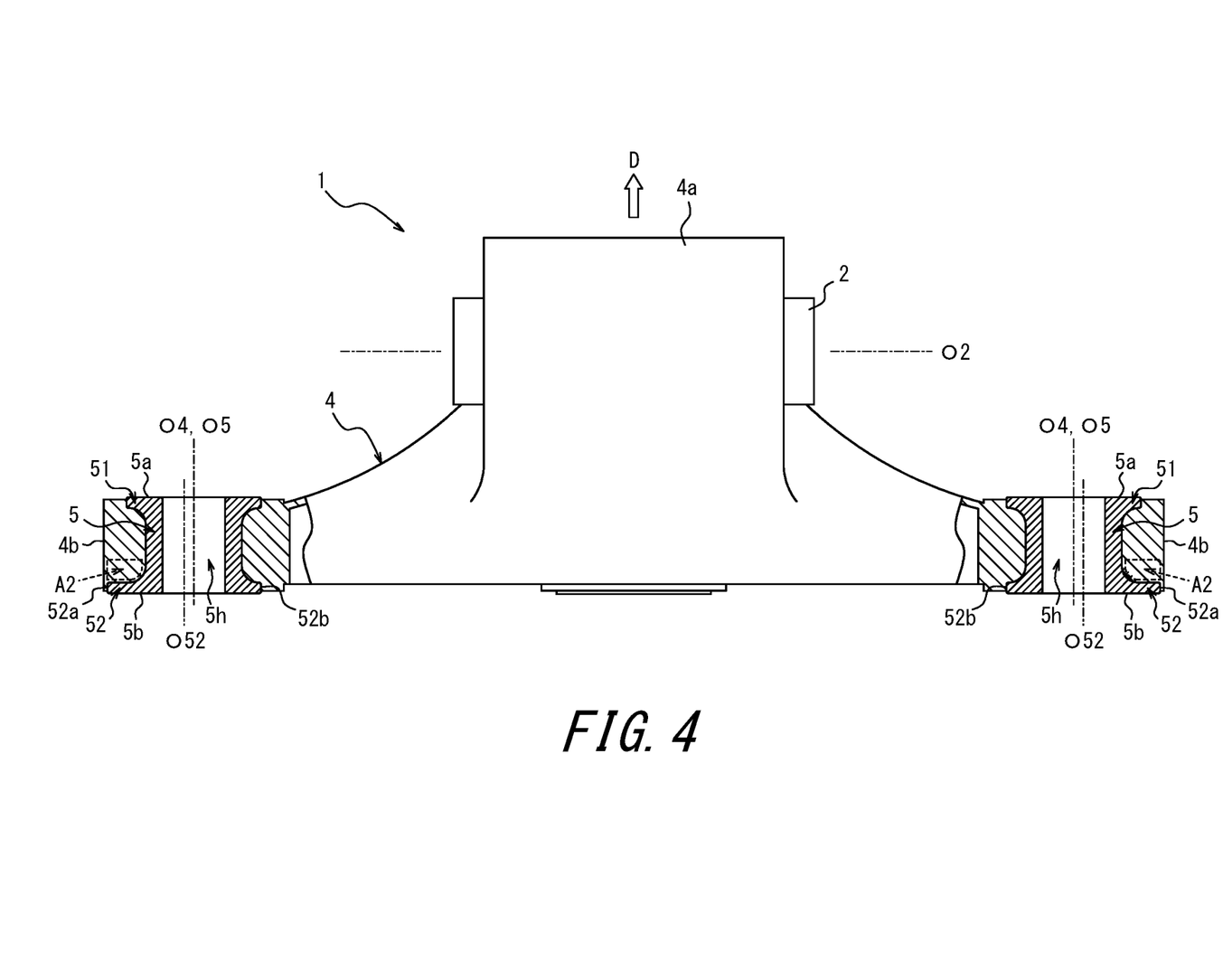
FIG. 4 is a front view illustrating the anti-vibration device of FIG. 1 in a partial cross section.
Figure 5:
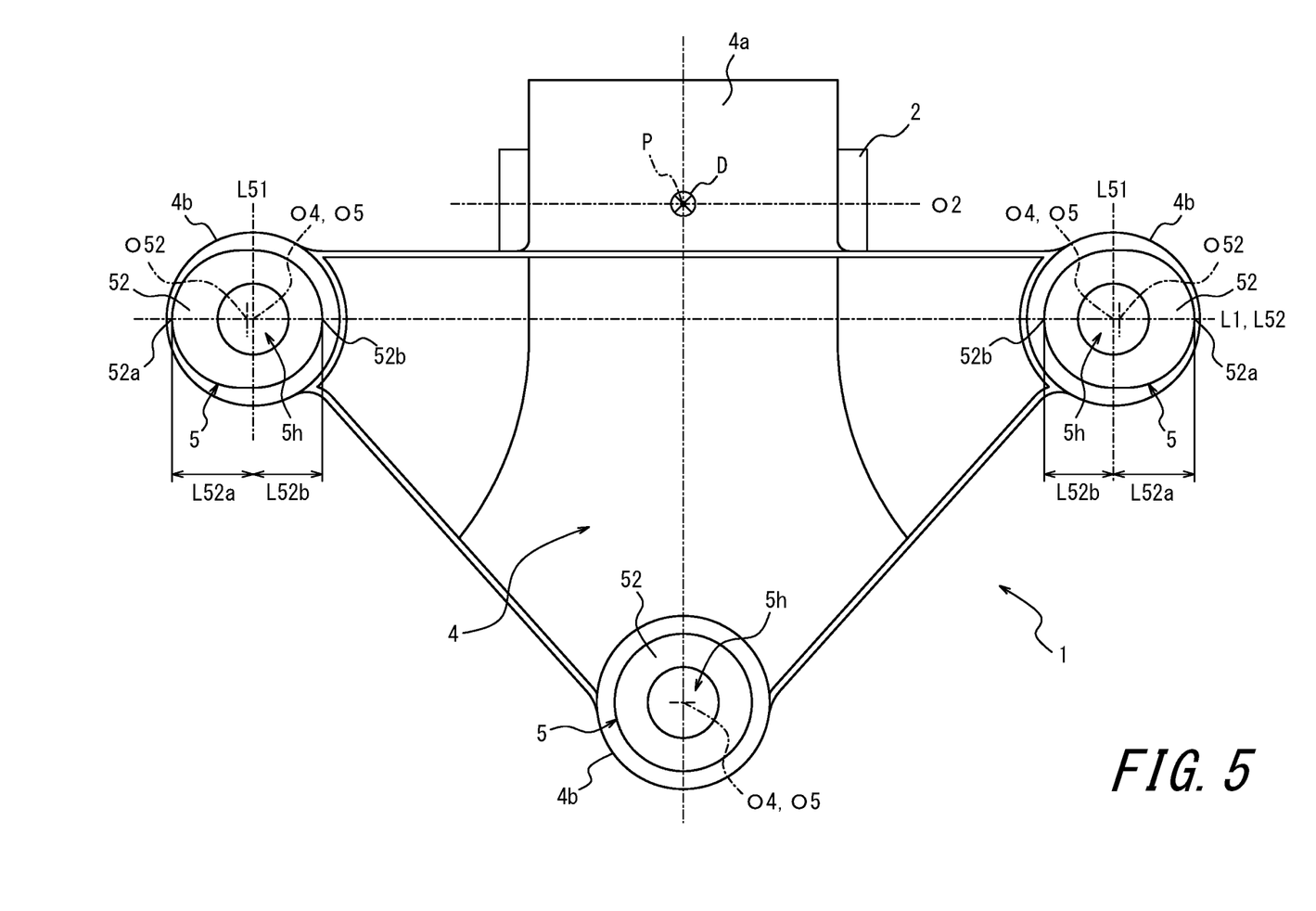
FIG. 5 is a plan view illustrating the anti-vibration device of FIG. 1 from the other side of the vibration generating side and the vibration transmitting side.

As illustrated in FIG. 4 and the like, in a front view or a back view of the anti-vibration device 1 of the present embodiment (also in a view in an extending direction of the virtual line in FIG. 3), each of the two metal fittings for fastening 5 crossed by the virtual line L1 has another flange portion 52 (hereinafter, also referred to as "second flange portion 52") on the edge 5b side far from the vibration input position P that is on the opposite side of the edge 5a close to the vibration input position P in the direction along the central axis O5 of the through hole 5h. In the present embodiment, the second flange portion 52 coincides with the other edge 5b of the metal fitting for fastening 5 and forms the other end portion of the metal fitting for fastening 5. In addition, in the present embodiment, the second flange portion 52 has a third outermost peripheral edge 52a and a fourth outermost peripheral edge 52b in the planar view, where the third outermost peripheral edge 52a is positioned outside in an extending direction of the virtual line L1; and the fourth outermost peripheral edge 52b is positioned inside in the extending direction of the virtual line L1 on the opposite side of the third outermost peripheral edge 52a of the second flange portion 52 across the through hole 5h, as illustrated in FIG. 5 and the like. In the present embodiment, the third outermost peripheral edge 52a and the fourth outermost peripheral edge 52b of the second flange portion 52 are arranged on an axis L52, as illustrated in FIG. 5. In the present embodiment, the axis L52 is an axis coaxial with the virtual line L1.

In the anti-vibration device 1 of the present embodiment, for each of the two metal fittings for fastening 5 crossed by the virtual line L1 among the three metal fittings for fastening 5, the second flange portion 52 is configured such that a length L52a in the extending direction of the virtual line L1 from the central axis O5 of the through hole 5h of the metal fitting for fastening 5 to the third outermost peripheral edge 52a is longer than a length L52b in the extending direction of the virtual line L1 from the central axis O5 of the through hole 5h of the metal fitting for fastening 5 to the fourth outermost peripheral edge 52b. In the present embodiment, the length L52a of the third outermost peripheral edge 52a is a length in a direction along the axis L52 from the central axis O5 of the through hole 5h of the metal fitting for fastening 5 to the third outermost peripheral edge 52a of the second flange portion 52, as illustrated in FIG. 5 and the like. In addition, in the present embodiment, the length L52b of the fourth outermost peripheral edge 52b is a length L52b in the direction along the axis L52 from the central axis O5 of the through hole 5h of the metal fitting for fastening 5 to the fourth outermost peripheral edge 52b of the second flange portion 52.

According to the anti-vibration device 1 of the present embodiment, in each of the two metal fittings for fastening 5 crossed by the virtual line L1, the second flange portion 52 of the metal fitting for fastening 5 is extended toward the third outermost peripheral edge 52a side, which enlarges the portion of the second flange portion 52 on the third outermost peripheral edge 52a side, as illustrated in the cross section of FIG. 4. In this way, the area where the metal fitting for fastening 5 covers the metal fitting holding portion 4b of the bracket 4 can be increased in a region adjacent to the region on the third outermost peripheral edge 52a side of the second flange portion 52 in the metal fitting for fastening 5, that is, a region A2 of the metal fitting holding portion 4b adjacent to the metal fitting for fastening 5, as illustrated in FIG. 4.

In the anti-vibration device 1 of the present embodiment, when the attachment member 2 is pulled at the vibration input position P to the upward direction in FIG. 4, for example, the entire bracket 4 is also pulled upward, as described above.

In a conventional anti-vibration device, when the entire bracket 4 is pulled upward, a large stress concentration occurs locally in the bracket 4, as described above.

On the other hand, by providing a second flange portion 52 as in the anti-vibration device 1 of the present embodiment, the large stress concentration that occurs locally in the above-mentioned portion of the region that extends from the region A2 side of the metal fitting holding portion 4b toward the cylindrical portion 4a in the bracket 4 and in the above-mentioned portion of the outside region on the opposite side of the metal fitting for fastening 5 in the region of the cylindrical portion 4a is further reduced.

As described above, according to the anti-vibration device 1 of the present embodiment, by further defining the positional relationship between the vibration input position P and the central axes O5 of the through holes 5h of the two metal fittings for fastening 5 for the metal fitting for fastening 5 and providing the metal fitting for fastening 5 with a second flange portion 52 having a particular shape, the stress concentration occurring in the bracket 4 is further suppressed when a vibration is input under specific conditions.

Particularly in the anti-vibration device 1 of the present embodiment, for each of the second flange portions 52 of the two metal fittings for fastening 5 crossed by the virtual line L1, the outline shape of the second flange portion 52 is, in the planar view, an elongated shape in which a length in the direction along the virtual line L1 is longer than a length in the direction orthogonal to the virtual line L1, as illustrated in FIG. 5. In this case, it is possible to reduce the size of the external shape (outline shape) of the entire second flange portion 52 while extending the second flange portion 52 of the metal fitting for fastening 5 toward the third outermost peripheral edge 52a side. As a result, according to the anti-vibration device 1 of the present embodiment, it is possible to suppress the stress concentration while reducing the size of the second flange portion 52.

In the anti-vibration device 1 of the present embodiment, the outline shape of the second flange portion 52 is an elliptical shape in the planar view. That is, the center O52 of the elliptical shape is arranged at a position that is more outside in the extending direction of the virtual line L1 than the central axis O5 of the through hole 5h of the metal fitting for fastening 5. In this case, it is possible to further suppress the stress concentration while further reducing the size of the second flange portion 52.

In the anti-vibration device 1 of the present embodiment, the at least two metal fittings for fastening 5 are three metal fittings for fastening 5. In addition, in the present embodiment, the virtual line L1 passes through the central axes O5 of the through holes 5h of two metal fittings for fastening 5, and the remaining one metal fitting for fastening 5 is arranged at a position on the opposite side of the vibration input position P across the virtual line L1 in the planar view, as illustrated in FIG. 2 and the like. In this case, the stress concentration occurring in the bracket 4 fastened at three points can be suppressed.

In the anti-vibration device 1 of the present embodiment, the attachment member 2 is a cylindrical member extending in a direction along the virtual line L1, as illustrated in FIG. 2 and the like. In this case, even if the vibration generating side and the vibration transmitting side are rod-shaped members such as a shaft, the attachment member 2 can be easily attached with a simple configuration.

The above description merely discloses one embodiment of the present disclosure, and various modifications may be made within the scope of the claims. For example, the metal fitting for fastening 5 may be configured by a nut. In the present embodiment, the "direction along the central axis O5 of the through hole 5h" includes two meanings of the "direction parallel to the central axis O5 of the through hole 5h" and the "direction substantially parallel to the central axis O5 of the through hole 5h". The same applies to the "direction along the virtual line L1" and the "direction along the direction orthogonal to the virtual line L1", which include two meanings of "parallel direction" and "substantially parallel direction".

REFERENCE SIGNS LIST 1 anti-vibration device
2 attachment member
O2 central axis of the attachment member
3 elastic member
4 bracket
4a cylindrical portion
4b metal fitting holding portion
O4 fastening axis of the bracket
5 metal fitting for fastening
5a one edge of the metal fitting for fastening
5b the other edge of the metal fitting for fastening
5h through hole
O5 central axis of the through hole of the metal fitting for fastening
51 first flange portion (flange portion)
51a first outermost peripheral edge of the first flange portion
51b second outermost peripheral edge of the first flange portion
L51a length to the first outermost peripheral edge of the first flange portion
L51b length to the second outermost peripheral edge of the first flange portion
52 second flange portion (another flange portion)
52a third outermost peripheral edge of the second flange portion
52b fourth outermost peripheral edge of the second flange portion
D input direction of vibration (direction of moment force)
L52a length to the third outermost peripheral edge of the second flange portion
L52b length to the fourth outermost peripheral edge of the second flange portion
L1 virtual line
L51 axis (major axis)
L52 axis (major axis)
P input position of vibration

The invention claimed is:
1. An anti-vibration device, comprising
an attachment member that can be attached to one side of a vibration generating side and a vibration transmitting side,
an elastic member,
a bracket that is made of a synthetic resin and is connected to the attachment member via the elastic member, and at least two metal fittings for fastening that have a through hole for fastening the bracket to the other side of the vibration generating side and the vibration transmitting side, wherein the bracket and the metal fittings for fastening are integrally formed;

a vibration input position is a position that does not coincide with a virtual line passing through central axes of the through holes of two of the metal fittings for fastening in a planar view of the anti-vibration device;

the metal fitting for fastening has a flange portion on an edge side close to the vibration input position in a direction along the central axis of the through hole; and in the planar view, the flange portion has a first outermost peripheral edge and a second outermost peripheral edge, where the first outermost peripheral edge is positioned on a side of the vibration input position in a direction orthogonal to the virtual line, and the second outermost peripheral edge is positioned on the opposite side of the first outermost peripheral edge across the through hole and at a position that is farthest from the vibration input position in the direction orthogonal to the virtual line, and a length in the direction orthogonal to the virtual line from the central axis of the through hole of the metal fitting for fastening to the first outermost peripheral edge is longer than a length in the direction orthogonal to the virtual line from the central axis of the through hole of the metal fitting for fastening to the second outermost peripheral edge.

2. The anti-vibration device according to claim 1, wherein, in the planar view, the flange portion has an outline shape which is an elongated shape where a length in a direction along the direction orthogonal to the virtual line is longer than a length in a direction along the virtual line.

3. The anti-vibration device according to claim 2, wherein, in the planar view, the outline shape of the flange portion is an elliptical shape.

4. The anti-vibration device according to claim 1, wherein the metal fitting for fastening has another flange portion on an edge side far from the vibration input position that is on the opposite side of the edge close to the vibration input position in the direction along the central axis of the through hole; and in the planar view, the other flange portion has a third outermost peripheral edge and a fourth outermost peripheral edge, where the third outermost peripheral edge is positioned outside in an extending direction of the virtual line, and the fourth outermost peripheral edge is positioned inside in the extending direction of the virtual line on the opposite side of the third outermost peripheral edge across the through hole, and a length in the extending direction of the virtual line from the central axis of the through hole of the metal fitting for fastening to the third outermost peripheral edge is longer than a length in the extending direction of the virtual line from the central axis of the through hole of the metal fitting for fastening to the fourth outermost peripheral edge.

5. The anti-vibration device according to claim 4, wherein, in the planar view, the other flange portion has an outline shape which is an elongated shape where a length in a direction along the virtual line is longer than a length in a direction along the direction orthogonal to the virtual line.

6. The anti-vibration device according to claim 5, wherein, in the planar view, the outline shape of the other flange portion is an elliptical shape.

7. The anti-vibration device according to claim 1, wherein the at least two metal fittings for fastening are three metal fittings for fastening, the virtual line passes through the central axes of the through holes of two of the metal fittings for fastening, and the remaining one metal fitting for fastening is arranged at a position on the opposite side of the vibration input position across the virtual line in the planar view.

8. The anti-vibration device according to claim 1, wherein the attachment member is a cylindrical member extending in a direction along the virtual line.

9. The anti-vibration device according to claim 2, wherein the metal fitting for fastening has another flange portion on an edge side far from the vibration input position that is on the opposite side of the edge close to the vibration input position in the direction along the central axis of the through hole; and in the planar view, the other flange portion has a third outermost peripheral edge and a fourth outermost peripheral edge, where the third outermost peripheral edge is positioned outside in an extending direction of the virtual line, and the fourth outermost peripheral edge is positioned inside in the extending direction of the virtual line on the opposite side of the third outermost peripheral edge across the through hole, and a length in the extending direction of the virtual line from the central axis of the through hole of the metal fitting for fastening to the third outermost peripheral edge is longer than a length in the extending direction of the virtual line from the central axis of the through hole of the metal fitting for fastening to the fourth outermost peripheral edge.

10. The anti-vibration device according to claim 2, wherein the at least two metal fittings for fastening are three metal fittings for fastening, the virtual line passes through the central axes of the through holes of two of the metal fittings for fastening, and the remaining one metal fitting for fastening is arranged at a position on the opposite side of the vibration input position across the virtual line in the planar view.

11. The anti-vibration device according to claim 2, wherein the attachment member is a cylindrical member extending in a direction along the virtual line.

12. The anti-vibration device according to claim 4, wherein the at least two metal fittings for fastening are three metal fittings for fastening, the virtual line passes through the central axes of the through holes of two of the metal fittings for fastening, and the remaining one metal fitting for fastening is arranged at a position on the opposite side of the vibration input position across the virtual line in the planar view.

13. The anti-vibration device according to claim 4, wherein the attachment member is a cylindrical member extending in a direction along the virtual line.

14. The anti-vibration device according to claim 7, wherein the attachment member is a cylindrical member extending in a direction along the virtual line.

15. The anti-vibration device according to claim 3, wherein the metal fitting for fastening has another flange portion on an edge side far from the vibration input position that is on the opposite side of the edge close to the vibration input position in the direction along the central axis of the through hole; and in the planar view, the other flange portion has a third outermost peripheral edge and a fourth outermost peripheral edge, where the third outermost peripheral edge is positioned outside in an extending direction of the virtual line, and the fourth outermost peripheral edge is positioned inside in the extending direction of the virtual line on the opposite side of the third outermost peripheral edge across the through hole, and a length in the extending direction of the virtual line from the central axis of the through hole of the metal fitting for fastening to the third outermost peripheral edge is longer than a length in the extending direction of the virtual line from the central axis of the through hole of the metal fitting for fastening to the fourth outermost peripheral edge.

16. The anti-vibration device according to claim 3, wherein the at least two metal fittings for fastening are three metal fittings for fastening, the virtual line passes through the central axes of the through holes of two of the metal fittings for fastening, and the remaining one metal fitting for fastening is arranged at a position on the opposite side of the vibration input position across the virtual line in the planar view.

17. The anti-vibration device according to claim 3, wherein the attachment member is a cylindrical member extending in a direction along the virtual line.

18. The anti-vibration device according to claim 9, wherein, in the planar view, the other flange portion has an outline shape which is an elongated shape where a length in a direction along the virtual line is longer than a length in a direction along the direction orthogonal to the virtual line.

19. The anti-vibration device according to claim 9, wherein the at least two metal fittings for fastening are three metal fittings for fastening, the virtual line passes through the central axes of the through holes of two of the metal fittings for fastening, and the remaining one metal fitting for fastening is arranged at a position on the opposite side of the vibration input position across the virtual line in the planar view.

20. The anti-vibration device according to claim 9, wherein the attachment member is a cylindrical member extending in a direction along the virtual line.

* * * * *